United States Patent
Sakane

(10) Patent No.: US 6,914,101 B2
(45) Date of Patent: Jul. 5, 2005

(54) POLYESTER BLOCK COPOLYMER COMPOSITION

(75) Inventor: Masanori Sakane, Ohtake (JP)

(73) Assignee: Daicel Chemical Industries, Ltd., Sakai (JP)

(*) Notice: Subject to any disclaimer, the term of this patent is extended or adjusted under 35 U.S.C. 154(b) by 0 days.

(21) Appl. No.: 10/451,963

(22) PCT Filed: Apr. 1, 2002

(86) PCT No.: PCT/JP02/03268
§ 371 (c)(1),
(2), (4) Date: Nov. 14, 2003

(87) PCT Pub. No.: WO02/081563
PCT Pub. Date: Oct. 17, 2002

(65) Prior Publication Data
US 2004/0072963 A1 Apr. 15, 2004

(30) Foreign Application Priority Data
Apr. 3, 2001 (JP) .................................... 2001-105185

(51) Int. Cl.[7] .............................................. C08F 20/00
(52) U.S. Cl. ................... 525/438; 528/296; 528/298; 528/300; 528/302; 528/307; 528/308; 528/308.6; 528/354; 528/356; 525/437; 525/439; 525/471; 524/706
(58) Field of Search .............................. 528/296, 298, 528/300, 302, 307, 308, 308.6, 354, 356; 525/437, 438, 439, 471; 524/706

(56) References Cited

FOREIGN PATENT DOCUMENTS

| JP | 48-004115 B | 2/1973 |
|---|---|---|
| JP | 48-004116 B | 2/1973 |
| JP | 52-049037 B | 12/1977 |
| JP | 58-162654 A | 9/1983 |
| JP | 59-152947 A | 8/1984 |
| JP | 59-155458 A | 9/1984 |
| JP | 60-170660 A | 9/1985 |
| JP | 04-178453 A | 6/1992 |
| JP | 04-253764 A | 9/1992 |
| JP | 04-264156 A | 9/1992 |
| JP | 07-331046 A | 12/1995 |
| JP | 10-025401 A | 1/1998 |
| JP | 10-030053 A | 2/1998 |
| JP | 11-021436 A | 1/1999 |
| JP | 2000-143950 A | 5/2000 |

OTHER PUBLICATIONS

International Search Report.

*Primary Examiner*—Samuel A. Acquah
(74) *Attorney, Agent, or Firm*—Morgan & Finnegan LLP

(57) ABSTRACT

The present invention relates to a polyester block copolymer composition which is obtained by reacting 0.5 to 5.0 parts by weight of an epoxy compound (C) having two or more functionalities with 100 parts by weight of a polyester block copolymer (P) having an acid value of 0 to 5 mgKOH/g obtained by reacting a crystalline aromatic polyester (A) having a hydroxyl group at a molecular terminal with a lactone (B) and optionally with a polyfunctional compound (D) having three or more groups selected among carboxyl, hydroxyl, and/or ester groups thereof. The composition has such excellent moldability that it is applicable to molding techniques including blow molding without arousing any trouble. It is satisfactory in heat resistance, water resistance, impact resistance, or flame retardancy, and has rubber-like elasticity.

11 Claims, No Drawings

POLYESTER BLOCK COPOLYMER COMPOSITION

TECHNICAL FIELD

The present invention relates to a polyester block copolymer composition and, more particularly, to a polyester block copolymer composition endowed with excellent heat resistance, water resistance, impact resistance, and flame retardancy. The polyester block copolymer composition according to the present invention exhibits excellent stability in viscosity during molding and can be molded through any types of molding methods such as injection molding, extrusion molding, and blow molding.

BACKGROUND ART

Conventionally known methods for producing a polyester block copolymer include reaction of an aromatic polyester and a lactone; e.g., a method (Japanese Patent Application Laid-Open (kokai) No. 48-4116) including reaction of a crystalline aromatic polyester and a lactone; a method (Japanese Patent Application Laid-Open (kokai) No. 48-4115) including reacting a crystalline aromatic polyester with a lactone, to thereby yield an initial copolymer, and reacting a poly-functional acylating agent with the initial copolymer for chain-extension; and a method (Japanese Patent Publication (kokoku) No. 52-49037) including solid-polymerization of a lactone in the presence of a crystalline aromatic polyester.

Polyester block copolymers produced through these methods have excellent rubber-like elasticity and weatherability. However, these copolymers have drawbacks; i.e., poor heat resistance which induces a considerable drop in viscosity, strength, elongation, etc. due to exposure to high-temperature conditions for a long period of time. Furthermore, these copolymers have no strain hardenability, which is an important factor during blow molding, and, therefore, cannot provide molded products of uniform thickness through blow molding.

In order to improve heat resistance and moldability of the aforementioned types of polyester block copolymers, several methods have been proposed; e.g., a method (Japanese Patent Application Laid-Open (kokai) No. 58-162654) including addition of an epoxy compound having one or more functionalities; a method (Japanese Patent Application Laid-Open (kokai) No. 59-152947) including addition of an epoxy compound having one or more functionalities and an aliphatic carboxylic acid metal salt; and a method (Japanese Patent Application Laid-Open (kokai) No. 59-155458) including addition of an epoxy compound having one or more functionalities and an ethylene-carboxylic acid copolymer. However, compositions obtained through these methods have drawbacks; e.g., a drop in heat resistance, and relatively low melt viscosity and poor stability in quality caused by difficulty in correlating the amount of aliphatic carboxylic acid metal salt added and the dependency of melt viscosity on elongation strain rate.

Other proposed methods include a method (Japanese Patent Application Laid-Open (kokai) No. 60-170660) including addition of an epoxy compound and a metallic compound; a method (Japanese Patent Application Laid-Open (kokai) No. 4-178453) including addition of an epoxy compound having one or more functionalities and a sulfonate salt or a sulfate salt; and a method (Japanese Patent Application Laid-Open (kokai) No. 4-253764) including addition of an epoxy compound having on or more functionalities and a pentavalent phosphorus compound. However, these methods also have drawbacks; e.g., a large increase in viscosity or excessively small melt viscosity during molding. A method (Japanese Patent Application Laid-Open (kokai) No. 4-264156) including addition of an epoxy compound having one or more functionalities and a phosphite compound also has a drawback in that water resistance of products drops considerably.

Recently, in order to overcome all these drawbacks, a method (Japanese Patent Application Laid-Open (kokai) No. 07-331046) including addition of an epoxy compound having two or more functionalities and an imidazole compound has been proposed. However, this method also has a drawback, in that the dependency of melt viscosity on elongation strain rate (i.e., strain hardenability) is still poor and quality of blow-molded products varies. "Strain hardenability" is a property that melt viscosity increases with increasing elongation rate. Thus, when strain hardenability is large, a well-stretched (upon blow molding) portion is not further stretched by virtue of high viscosity, whereas when an insufficiently stretched portion is stretched by virtue of low viscosity, thereby resulting in uniform thickness.

In addition, similar methods (Japanese Patent Application Laid-Open (kokai) Nos. 10-25401, 10-30053, 11-21436, and 2000-143950) employing a low-volatile epoxy compound having two functionalities have been proposed. However, these methods have not yet resolved the problem that a large increase in viscosity during molding results in failure to stabilize quality of products.

The present invention has been accomplished in view of the aforementioned problems. Thus, an object of the present invention is to provide a polyester block copolymer composition which has such excellent moldability that the composition can be molded without problems through a variety of molding methods including blow molding and which is endowed with rubber-like elasticity and excellent heat resistance, water resistance, impact resistance, and flame retardancy.

DISCLOSURE OF THE INVENTION

The present inventors have carried out extensive studies, and have found that the molecular weight of a polyester block copolymer composition which is yielded by adding a polyfunctional epoxy compound to a polyester block copolymer which has a specific acid value and a water content less than a specific level and which is produced by reacting a crystalline aromatic polyester and a lactone; heating the mixture; and kneading the mixture can be controlled by use of only an epoxy compound having at least two functionalities, and that a polyester block copolymer having an acid value higher than the above-specified level excessively elevates its molecular weight, thereby forming gel, unless an epoxy compound having mono-functionality is added to the copolymer. The present invention has been accomplished on the basis of these findings.

Accordingly, a first mode of the invention provides a polyester block copolymer composition which is obtained by reacting 0.5 to 5.0 parts by weight of an epoxy compound (C) having two or more functionalities with 100 parts by weight of a polyester block copolymer (P) having an acid value of 0 to 5 mgKOH/g obtained by reacting a crystalline aromatic polyester (A) having a hydroxyl group at a molecular terminal with a lactone (B) and optionally with a polyfunctional compound (D) having three or more groups selected from among a carboxyl group, a hydroxyl group, and/or an ester group thereof.

A second mode is drawn to a specific embodiment of the polyester block copolymer composition of the first mode of the invention, wherein the polyfunctional compound (D) is a polyfunctional compound (D1) in which at least one group selected from among a carboxyl group, a hydroxyl group, and/or an ester group thereof is a carboxyl group or an ester group thereof, and the polyester block copolymer composition is formed by reacting 0.1 to 200 mol % of the polyfunctional compound (D1) with 100 mol % of the crystalline aromatic polyester (A).

A third mode is drawn to a specific embodiment of the polyester block copolymer composition of the first mode of the invention, wherein the polyfunctional compound (D) is a polyfunctional compound (D2) which has neither carboxyl group nor an ester group thereof, and the polyester block copolymer composition is formed by reacting 0.1 to 150 mol % of the polyfunctional compound (D2) with 100 mol % of the crystalline aromatic polyester (A).

A fourth mode is drawn to a specific embodiment of the polyester block copolymer composition of any one of the first to third modes of the invention, which further contains a mono-alcohol (d) and/or a polyol (d') in a total amount of 0.1 to 3.0 parts by weight based on 100 parts by weight of the polyester block copolymer (P).

A fifth mode is drawn to a specific embodiment of the polyester block copolymer composition of any one of the first to third modes of the invention, which contains the epoxy compound (C) having two or more functionalities and/or an epoxy compound (C') having a halogen in a total amount of 2.0 to 30.0 parts by weight based on 100 parts by weight of the polyester block copolymer (P).

A sixth mode is drawn to a specific embodiment of the polyester block copolymer composition of the fifth mode, which further contains a mono-alcohol (d) and/or a polyol (d') in a total amount of 0.5 to 28.0 parts by weight based on 100 parts by weight of the polyester block copolymer (P).

A seventh mode is drawn to a specific embodiment of the polyester block copolymer composition of any one of the first to sixth modes of the invention, which further contains a trivalent phosphorus compound (F) in an amount of 0.1 to 10 parts by weight based on 100 parts by weight of the polyester block copolymer (P).

An eighth mode is drawn to a specific embodiment of the polyester block copolymer composition of any one of the first to seventh modes, wherein the epoxy compound (C) having two or more functionalities is an alicyclic epoxide, a glycidyl ester, or a mixture thereof.

A ninth mode is drawn to a specific embodiment of the polyester block copolymer composition of the fifth mode, wherein the epoxy compound (C') having a halogen is an epoxy compound having a bromine atom.

A tenth mode is drawn to a specific embodiment of the polyester block copolymer composition of any one of the first to ninth modes, wherein the polyester block copolymer (P) has a water content of 300 ppm or less.

An eleventh mode is drawn to a specific embodiment of the polyester block copolymer composition of any one of the first to tenth modes, which has an acid value of 1.0 mgKOH/g or less.

BEST MODE FOR CARRYING OUT THE INVENTION

Modes for carrying out the present invention will next be described.

The polyester block copolymer (P) in the present invention is produced by reacting a crystalline aromatic polyester (A) with a lactone (B).

Firstly, the components constituting the polyester block copolymer employed in the present invention will be described in detail.

<Crystalline Aromatic Polyester (A)>

The crystalline aromatic polyester (A) employed in the present invention is a polyester produced from an acid component (a) and a diol component (b). The acid component (a) comprises an aromatic dicarboxylic acid as an essential component and an aliphatic dicarboxylic acid and/or an alicyclic dicarboxylic acid which are optionally added in accordance with needs. The diol component (b) comprises an aliphatic diol, an aromatic diol, and/or an alicyclic diol. The polyester is predominantly formed of ester bonds and, at a molecular terminal, has a hydroxyl group.

The aforementioned crystalline aromatic polyester (A) preferably has a high polymerization degree and a melting point of 160° C. or higher. When subjected to molding, the polyester preferably has a number average molecular weight of 5,000 or more.

<Acid Component (a)>

Among acid components (a) constituting the crystalline aromatic polyester (A), specific examples of aromatic dicarboxylic acids include terephthalic acid, isophthalic acid, 2,6-naphthalenedicarboxylic acid, and biphenyldicarboxylic acid, or the like.

Among aliphatic dicarboxylic acids, C2 to C 20 dicarboxylic acids are preferred. Examples of aliphatic carboxylic acids include succinic acid, glutaric acid, adipic acid, azelaic acid, sebacic acid, dodecanedioic acid, and dimer acid, or the like.

Further, examples of alicyclic dicarboxylic acids include 1,4-cyclohexanedicarboxylic acid, or the like.

When employed as raw materials, these dicarboxylic acids may be esters, acid chlorides, or anhydrides thereof.

<Diol Component (b)>

Subsequently, among diol components (b) constituting the crystalline aromatic polyester (A), specific examples of aliphatic glycols include, for example, 1,4-butanediol, 1,3-butanediol, 1,2-butanediol, ethylene glycol, propylene glycol, 1,2-propanediol, 1,3-propanediol, 1,5-pentanediol, 3-methyl-1,5-pentanediol, 1,9-nonanediol, 1,6-hexanediol, neopentyl glycol, and a polymethylene glycol, or the like.

Examples of aromatic diols include, for example, resorcinol, naphthalenediol, 2,2-bis(4-hydroxyphenyl) propane, bisphenol A-alkylene oxide (e.g., ethylene oxide and propylene oxide) adducts; such as 2,2-bis(4-hydroxyethoxyphenyl)propane, 2,2-bis(4-hydroxydiethoxyphenyl)propane, 2,2-bis(4-hydroxytriethoxyphenyl)propane, and 2,2-bis(4-hydroxypolyethoxyphenyl)propane, or the like.

Further, examples of alicyclic diols include, for example, 1,4-cyclohexanediol, 1,4-cyclohexanedimethanol, 2,2-bis(4-hydroxyethoxycyclohexyl)propane, and hydrogenated bisphenol A-alkylene oxide (e.g., ethylene oxide and propylene oxide) adducts.

Among the above-exemplified components constituting the crystalline aromatic polyester (A), butylene terephthalate unit and ethylene terephthalate unit are preferably contained in an amount of at least 60 mol % from the viewpoint of crystallinity, heat resistance, and material cost.

<Lactone (B)>

Still further, examples of the lactones (B) include ε-caprolactone, methylated (e.g., 2-methyl, 4-methyl, or 4,4'-dimethyl) (ε-caprolactone), δ-valerolactone, methylated (δ-valerolactone), and β-propiolactone, or the like. Of these, ε-caprolactone is most preferred from the viewpoint of cost.

Furthermore, a polymer formed of one or more species of the aforementioned lactones (B) may be employed as a constituent of the polyester block copolymer employed in the present invention.

The ratio by weight of crystalline aromatic polyester (A) to lactone (B) in the copolymer is preferably 97/3 to 30/70, more preferably 90/10 to 55/45.

<Polyfunctional Compound (D)>

No particular limitation is imposed on the species of the polyfunctional compound (D) employed in the present invention so long as the compound is an aliphatic and/or aromatic compound having, in one molecule, three or more groups selected from among a carboxyl group, a hydroxyl group, and/or an ester group thereof.

Through employment of the polyfunctional compound (D), a branch structure is introduced into the polyester, thereby remarkably enhancing strain hardenability. These polyfunctioal compounds (D) may be introduced into a molecule through transesterification during polymerization, or may be introduced into a molecule in combination of an epoxy compound.

Examples of preferred polyfunctional compounds (D) include aliphatic polycarboxylic acids such as butanetetracarboxylic acid; aliphatic polyols such as glycerin, trimethylolethane, trimethylolpropane (hereinafter abbreviated as TMP), and pentaerythritol; aromatic polycarboxylic acids such as trimesic acid, trimellitic acid, 1,2,3-benzenetricarboxylic acid, pyromellitic acid, and 1,4,5,8-naphthalenetetracarboxylic acid; aromatic poly-alcohols such as 1,3,5-trihydroxybenzene; aliphatic hydroxycarboxylic acids such as dimethylolpropionic acid and dimethylolbutanoic acid; aromatic hydroxycarboxylic acids such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, and 2,4-dihydroxyphenylacetic acid; and compounds having a structural units derived from an ester derivative thereof or a similar compound.

The aforementioned polyfunctional compound (D) is a polyfunctional compound (D1) in which at least one group among a carboxyl group, a hydroxyl group, and/or an ester group thereof is a carboxyl group or an ester group thereof, or a polyfunctional compound (D2) which has neither carboxyl group nor an ester group thereof.

Polyester Block Copolymer (P)

The polyester block copolymer (P) in the present invention is produced by reacting, through mixing with heat in the presence or absence of a catalyst, the crystalline aromatic polyester (A) having a terminal hydroxyl group, a lactone (B), and a polyfunctional compound (D) to be optionally added.

The polyester block copolymer (P) comprises a polyester block copolymer (P0) which is exclusively formed from a crystalline aromatic polyester (A) and a lactone (B), or polyester block copolymer (P1) formed from a crystalline aromatic polyester (A), a lactone (B), and a polyfunctional compound (D).

When a polyfunctional compound (D1) is added as the polyfunctional compound (D), the polyester block copolymer (P1) forms a polyester block copolymer (P1'), whereas when a polyfunctional compound (D2) is added as the polyfunctional compound (D), the polyester block copolymer (P1) forms a polyester block copolymer (P1").

The polyfunctional compound (D1) having at lease one carboxyl group or an ester group thereof is added in an amount, on the basis of 100 mol % of the crystalline aromatic polyester (A), of 0.1 to 200 mol %, preferably 50 to 150 mol %. When the amount of the polyfunctional compound (D1) is less than 0.1 mol %, strain hardening is poor, thereby failing to provide, through blow molding, molded products having uniform thickness, whereas when the amount is in excess of 200 mol %, drop in melting point caused by transesterification predominates, thereby providing a heat resistance equivalent or inferior to heat resistance which the polyester block copolymer per se possesses.

The polyfunctional compound (D2) having neither carboxyl group nor ester group thereof is added in an amount, on the basis of 100 mol % of the crystalline aromatic polyester (A), of 0.1 to 150 mol %, preferably 50 to 120 mol %. When the amount of the polyfunctional compound is less than 0.1 mol %, strain hardening is poor, thereby failing to provide, through blow molding, molded products having uniform thickness, whereas when the amount is in excess of 150 mol %, drop in melting point caused by transesterification predominates, thereby providing a heat resistance equivalent or inferior to heat resistance which the polyester block copolymer per se possesses.

The thus-produced polyester block copolymer (P) has an acid value of 0 to 5 mgKOH/g, preferably 0 to 3 mgKOH/g.

The polyester block copolymer (P) having an acid value falling within the aforementioned ranges can be produced by reacting a crystalline aromatic polyester (A) having an acid value of 0 to 5 mgKOH/g and a water content of 300 ppm or less, preferably an acid value of 0 to 3 mgKOH/g and a water content of 200 ppm or less with a lactone (B) having an acid value of 0 to 1 mgKOH/g and a water content of 150 ppm or less, preferably an acid value of 0 to 0.5 mgKOH/g and a water content of 100 ppm or less. When the polyester block copolymer (P) has an acid value in excess of 5 mgKOH/g or a water content in excess of 300 ppm, the composition of the present invention exhibits an increase in viscosity upon molding. Such a viscosity-increased composition cannot be formed into satisfactory products in practice.

The acid value of the formed polyester block copolymer (P) depends on the acid value and water content of raw materials. Thus, when a raw material has a large water content, PCL is considered to be ring-opened by water, and the thus-formed acid terminals promote a reaction with an epoxy group.

The increase in viscosity of a composition upon molding allows to suppose that there is possibly caused a cross-linking reaction between an unreacted epoxy compound and an acid terminal which is present in or formed in the polyester block copolymer (P).

When the acid value of the polyester block copolymer (P) is caused to fall within the aforementioned ranges in the course of reaction, a commercial crystalline aromatic polyester (A)—having an acid value of 0 to 5 mgKOH/g—is further dehydrated, and such highly dehydrated polyester may be used.

The lactone (B), which typically has a water content of 200 ppm or higher, is subjected to rectification, to thereby yield a product having an acid value of 0 to 5 mgKOH/g and a water content of 150 ppm or less.

<Epoxy Compound (C) and Epoxy Compound having a Halogen (C')>

No particular limitation is imposed on the structure of the epoxy compound (C) employed in the present invention, so long as the compound has two or more epoxy groups in one molecule.

However, alicyclic epoxy compounds and glycidyl ester epoxy compounds are more preferable than glycidyl ether epoxy compounds in consideration of thermal history during compounding or molding of the composition of the present invention.

Non-limitative specific examples of the epoxy compounds include compounds represented by the following formulas (I) to (IV).

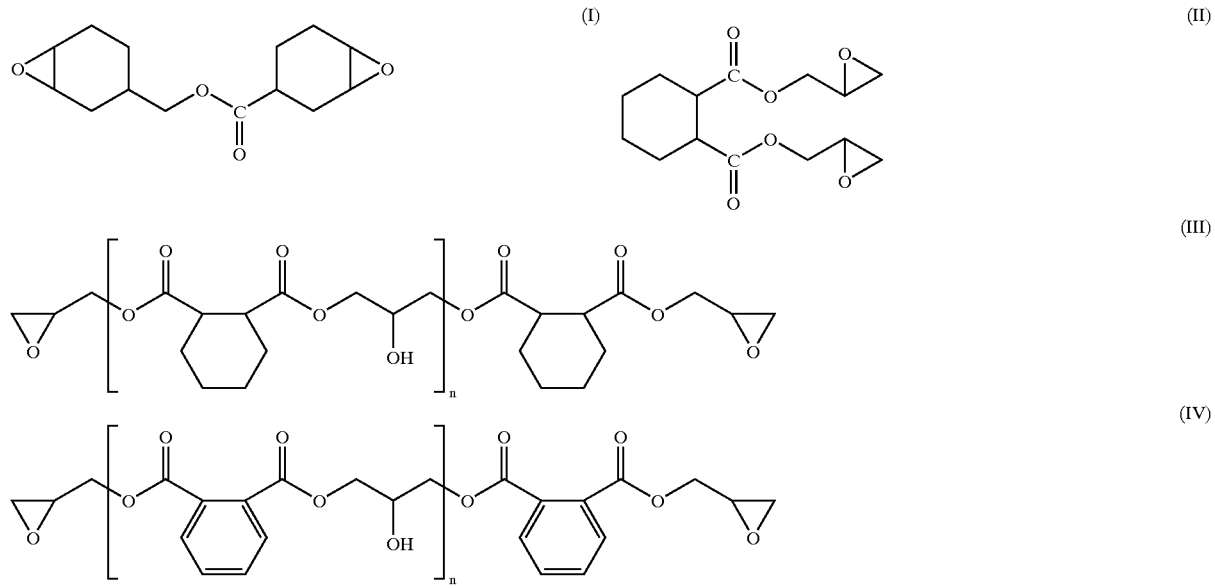

Examples of glycidyl ester compounds other than those represented by the above formulas (II) to (IV) include mono- and di-glycidyl esters of phthalic anhydride; mono- and di-glycidyl esters of methyltetrahydrophthalic acid; mono- and di-glycidyl esters of terephthalic acid; mono-, di-, and tri-glycidyl esters of trimellitic acid; and mono- and di-glycidyl esters of a dimer acid.

Examples of alicyclic epoxy compounds other than those represented by the above formula (I) include Celloxide 2081 (an adduct of 3,4-epoxycyclohexylmethyl-3',4'-epoxycyclohexanecarboxylate and 2 mol of ε-caprolactone, product of Daicel Chem. Ind., Ltd.); Celloxide 2083 (an adduct of 3 mol); Celloxide 2085 (an adduct of 4 mol); Epolead GT300 and Epolead GT400 (epoxidized products of tetrahydrophthalic anhydride esterified with tetrahydrobenzyl alcohol or lactone-modified product thereof, product of Daicel Chem. Ind., Ltd.); and bis(3,4-epoxycyclohexyl) adipate, or the like.

Examples of the glycidyl ether compounds include methyl glycidyl ether, phenyl glycidyl ether, polyethylene glycol monophenyl monoglycidyl ether, ethylene glycol diglycidyl ether, and diethylene glycol diglycidyl ether, or the like.

To the composition of the present invention, an epoxy compound (C') having a halogen may be added in accordance with needs. No particular limitation is imposed on the structure of the epoxy compound (C') having a halogen, so long as the compound has two or more epoxy groups and a halogen in one molecule.

The epoxy compound (C') having a halogen is preferably an epoxy compound having a bromine atom. Examples of such compounds include a self-extinguishing epoxy compound (Epomik R230, product of Mitsui chemicals, Inc.).

In the present invention, the aforementioned epoxy compounds may be used singly or in combination of two or more species.

No particular limitation is imposed on the method for blending the epoxy compound (C) or (C'). The epoxy compound (C) or (C') preferably has a water content of 300 ppm or less, more preferably 200 ppm or less. When the water content is in excess of 300 ppm, the composition of the present invention exhibits an elevated increase in viscosity upon molding.

No particular limitation is imposed on the amount of the epoxy compounds (C) and/or (C') added. When the epoxy compound (C') having a halogen is not used, the amount of the epoxy compound (C) is 0.5 to 5.0 parts by weight, and preferably 1.0 to 4.0 parts by weight. When the amount is less than 0.5 part by weight, effects by the compound on general heat resistance and water resistance in the polyester block copolymer (P) decrease, thereby considerably deteriorating thermal aging resistance, whereas when the amount is in excess of 5.0 parts by weight, an unreacted epoxy compound impairs moldability, and surfaces of molded products are prone to be rough.

When the epoxy compound (C') having a halogen is used, the total amount of the epoxy compounds is 2.0 to 30.0 parts by weight, and preferably 4.0 to 25.0 parts by weight. When the amount is less than 2.0 parts by weight, effects by the compounds on general heat resistance and water resistance in the polyester block copolymer (P) decrease, thereby considerably deteriorating thermal aging resistance and causing the incorporated hydroxyl-group-containing compound to ooze to the surface of molded products, whereas when the amount is in excess of 30.0 parts by weight, an unreacted epoxy compound impairs moldability, and surfaces of the molded products are prone to be rough.

No particular limitation is imposed on the structure of the mono-alcohol (d) and polyol (d') employed in the present invention, so long as the mono-alcohol has one hydroxyl group and the polyol has two or more hydroxyl groups. However, alcohols having a boiling point higher than kneading temperature are preferred from the viewpoint of operability. Examples of such compounds include hexanol, heptanol, octanol, butoxyethanol, phenol, ethoxyphenol, cyclohexanol, ethylene glycol, diethylene glycol, tetramethylene glycol, cyclohexanedimethanol, trimethylolpropane, and compounds formed by reacting these compounds with a lactone and/or a cyclic ether. These mono-alcohols and polyols may be used singly or in combination of two or more species.

The polyol (d') is added in order to react with an epoxy compound. In other words, the polyol is added in order to prevent heat-induced increase in viscosity or gelling during molding caused by an epoxy compound which remains unreacted during melt-kneading after addition. Since the polyol (d') is added simultaneously with the epoxy compound, a large portion thereof is considered to react with the epoxy compound(s) The total amount of the mono-alcohol (d) and polyol (d') added varies depending on the amounts of epoxy compound (C) and the epoxy compound (C') having a halogen added.

When the amount of epoxy compound (C) is 0.5 to 5.0 parts by weight, the total amount of the mono-alcohol (d) and polyol (d') added is preferably 3.0 parts by weight or less based on 100 parts by weight of the polyester block copolymer (P). When the total amount is in excess of 3.0 parts by weight, an unreacted compound impairs moldability, and surfaces of the molded products are prone to be rough.

When the epoxy compound having a halogen is added; i.e., the total amount of epoxy compounds (C) and (C') added is 2.0 to 30.0 parts by weight, the total amount of the mono-alcohol (d) and polyol (d') added is preferably 0.5 to 28.0 parts by weight based on 100 parts by weight of the polyester block copolymer (P).

In addition, the total amount of the mono-alcohol (d) and polyol (d') added is preferably smaller than the total amount of the epoxy compounds added, because the melting point of the composition is prone to drastically decrease in the case in which the total amount of the alcohols is larger than that of the epoxy compounds.

<Polyester Block Copolymer Composition>

The polyester block copolymer composition of the present invention is generally produced by melt-mixing a mixture containing a polyester block copolymer (P), the epoxy compound (C), the epoxy compound (C') having a halogen group to be optionally added, and the mono-alcohol (d) and/or polyol (d') to be optionally added. The melt-mixing may be performed in the absence or presence of a catalyst.

Any catalysts which can be generally applied to reaction of epoxy compounds can be used. Examples of compounds serving as the catalyst include amines, phosphorus compounds, and metal salts of Group Ia or IIa elements in a periodic table of $C \geq 10$ mono- or di-carboxylic acids. These catalysts may be used singly or in combination of two or more species. Of these, trivalent phosphorus compounds are preferred from the viewpoint of color hue of the composition to be produced. The amount of the catalyst added is 0.1 to 10 part by weight, and preferably 0.1 to 0.3 part by weight, based on 100 parts by weight of the polyester block copolymer (P). When the amount is less than 0.1 parts by weight, the catalytic effect is poor, whereas when the amount is in excess of 10 parts by weight, color hue is deteriorated.

The temperature of melt-mixing preferably falls within a range of a temperature higher by 5° C. than melting point of the crystalline polyester block copolymer (P) to 280° C. The time for mixing is about 30 seconds to about 60 minutes, appropriately being determined depending on the mixing method and temperature.

To the polyester block copolymer composition of the present invention, a stabilizer which is a trivalent phosphorus compound such as a hindered phenol, a phosphite ester, or an organic complex phosphite salt may be added.

These compounds serving as a stabilizer—exerting antioxidation effect and stabilizing effect against heat—are generally added to the crystalline aromatic polyester (A) which is a raw material.

Examples of phosphite esters and organic complex phosphite salts include tris(2,4-di-t-butylphenyl) phosphite, IRGAFOS 12 (product of Ciba), and diethyl 3,5-di-t-butyl-4-hydroxybenzylphosphonate, or the like.

The trivalent phosphorus compound (F) is added in an amount of 0.1 to 10 parts by weight based on 100 parts by weight of the polyester block copolymer (P).

Other additives such as a pigment and a weather stabilizer may further be optionally added depending upon needs.

In the present invention, addition of the aforementioned stabilizer and additives may be performed simultaneously with mixing with the aforementioned epoxy compound or separately.

EXAMPLES

Hereinafter, the present invention will be described by way of Examples and Comparative Examples, which should not be construed as limiting the invention thereto.

In Examples, the term "parts" refers to "parts by weight," and properties (MI value, tensile strength at break and percent elongation, melting point, color hue, acid value, resistance to hydrolysis, stability to heat, stability in melt viscosity, strain hardenability, and drawdown property) were determined in the following manners.

(1) MI (Melt Index) Value

MI value (unit: g/10 min) was measured at 230° C. by use of a weight (2.160 kg).

(2) Tensile Strength at Break and Percent Elongation

Chips of each composition were molded into flat sheets (thickness: 2 mm) by means of a heat press, and each flat sheet was subjected to blanking, to thereby yield dumbbell-shape specimens (No. 3). Each specimen was stretched at 200 mm/min, and the load (kg) and initial cross-section area ($cm^2$) at break were measured. The load was divided by the area, thereby deriving the strength ($kgf/cm^2$). Elongation (increase in length) at break was divided by the initial length of the specimen, thereby deriving percent elongation (%).

(3) Melting Point

Melting point of each specimen was measured by means of a differential scanning calorimeter (DSC) in accordance with JIS K 7121. The obtained fusion peak temperature was the corresponding melting point (° C.) of the specimen.

(4) Color Hue

Yellow index (YI) was determined by means of a color-difference meter Σ-90 (product of Nihon Densyoku Kogyo).

(5) Acid Value (5)-1 Aromatic Polyester, Block Copolymer Thereof, and Composition Thereof Each specimen was dried under reduced pressure at 100° C. for 20 hours. The thus-dried specimen (1.0 g) was dissolved in benzyl alcohol (50 g) by heating at 160° C. After the resultant solution was cooled, chloroform (50 g) was added. The resultant mixture was titrated by a (1/10)N KOH ethanol solution in the presence of phenolphthalein as an indicator. The titer was plotted at three different dissolution times appropriately selected from a range of 10 to 30 minutes, and these three points were extrapolated to a time of 0 minute. The acid value of benzyl alcohol and that of the chloroform mixture, which were determined separately, were subtracted from the above acid value at a time of 0 minute, thereby deriving the acid value (unit: mgKOH/g) of the specimen.

(5)-2 Lactone (B)

Each specimen (1.0 g) was dissolved in chloroform (20 g), and the resultant mixture was titrated by a (1/10)N KOH ethanol solution in the presence of phenolphthalein as an indicator.

(6) Resistance to Hydrolysis

Chips of each composition were molded into flat sheets (thickness: 2 mm) by means of a heat press, and each sheet was immersed in hot water (95° C.) for seven days so as to hydrolize the sheet. The thus-treated sheet was subjected to blanking, to thereby yield dumbbell-shape specimens (No. 3). Each specimen was stretched at 200 mm/min, and the load (kg) and initial cross-section area (cm²) at break were measured. The load was divided by the area, thereby deriving the strength (kg/cm²). Elongation (increase in length) at break was divided by the initial length of the specimen, thereby deriving percent elongation (%). The above resistance was represented by a ratio of percent elongation (hydrolyzation-treated) to percent elongation (untreated, as 100%).

(7) Stability to Heat

Chips of each composition were molded into flat sheets (thickness: 2 mm) by means of a heat press, and each sheet was allowed to stand in a gear oven adjusted at 160° C. for 14 days. The thus-treated sheet was subjected to blanking, to thereby yield dumbbell-shape specimens (No. 3). Each specimen was stretched at 200 mm/min, and the load (kg) and initial cross-section area (cm²) at break were measured. The load was divided by the area, thereby deriving the strength (kg/cm²). Elongation (increase in length) at break was divided by the initial length of the specimen, thereby deriving percent elongation (%). The above resistance was represented by a ratio of percent elongation (hydrolyzation-treated) to percent elongation (untreated, as 100%).

(8) Stability in Melt Viscosity

Into a cylindrical vessel maintained at 230° C., sufficiently dried resin composition was placed in the form of pellets, followed by maintaining at the temperature for 10 minutes with heating. Melt index (MI-B) of the thus-produced resin was immediately measured. The above stability is represented by a ratio of the MI (MI-B) to MI (MI-A) determined in accordance with JIS K 7210.

(9) Strain Hardenability

Elongation viscosity ($\eta_E$) and shear viscosity($\eta^+$) were measured. A nonlinear parameter, $\ln(\eta_E/3\eta^+)/\epsilon$, was defined, and $\epsilon$ was plotted versus $\ln(\eta_E/3\eta^+)$, to thereby obtain a straight line. The above strain hardenability is represented by the slope of the line. Herein, $\epsilon$ denotes strain.

(10) Drawdown Property

A capillary (diameter: 3 mm, length: 10 mm) was attached to Caprograph (product of Toyo Seiki), and resin was extruded at 240° C. and an extrusion rate of 20 mm/min. The ratio of time for stretching a strand to 300 mm to time for stretching a strand to 60 mm was calculated. For blow molding, the ratio is preferably 3 or higher.

"Mol" in Examples was based on the number average molecular weight (as reduced to PMMA) obtained through GPC measurement at a column temperature of 50° C. and a flow rate of 1.0 mL/min by use of hexafluoroisopropanol as an eluent. GPC measurement was performed by use of Shodex GPC HFIP-800P, HFIP-805P, HFIP-804P, and HFIP-803P (a column, product of Showa Denko K.K.) and RID-6A (a detector, a product of Shimadzu Corporation).

Production Example 1

Poly(butylene phthalate) (commercially available, melting point: 225° C., acid value: 3.5 mgKOH/g, water content: 520 ppm) produced from terephthalic acid and isophthalic acid serving as acid components and 1,4-butane diol serving as a glycol component were employed as the crystalline aromatic polyester (A). ε-Caprolactone (commercially available, acid value: 0.5 mgKOH/g, water content: 450 ppm) was employed as the lactone (B).

Poly(butylene phthalate) (60 parts) and ε-caprolactone (40 parts) were added to a reactor equipped with a stirrer, a thermometer, and a condenser and connected to a distilling line, and the resultant mixture was allowed to react at 235° C. for one hour with mixing. Subsequently, while the mixture was maintained at 235° C., the pressure was reduced from normal pressure to 1 torr or lower over 1 hour and maintained at 1 torr or less for a further one hour, to thereby remove ε-caprolactone remaining in the reaction system. The thus-obtained polyester block copolymer (acid value: 8.6 mgKOH/g, melting point: 205° C.) was dried at 120° C. for five hours, to thereby yield a copolymer (water content: 200 ppm) (polyester block copolymer [A]).

Production Example 2

Poly(butylene phthalate) employed in Production Example 1 was dried at 150° C. at 1 torr for 1 hour, and the dried product (acid value: 3.5 mgKOH/g, water content: 160 ppm) was employed as the crystalline aromatic polyester (A). Commercially available ε-caprolactone was distilled under reduced pressure, and the distilled product (acid value: 0.1 mgKOH/g, water content: 70 ppm) was employed as the lactone (B).

The procedure of Production Example 1 was repeated, except that starting materials were replaced by the above materials, to thereby yield a polyester block copolymer (acid value: 3.5 mgKOH/g, melting point: 203° C.) . The copolymer was dried at 120° C. for five hours, to thereby yield a copolymer (water content: 200 ppm) (polyester block copolymer [B]).

Production Example 3

Poly(butylene phthalate) (acid value: 3.5 mgKOH/g, water content: 160 ppm) and ε-caprolactone (acid value: 0.1 mgKOH/g, water content: 70 ppm) employed in Production Example 2 were employed as the crystalline aromatic polyester (A) and the lactone (B), respectively.

The procedure of Production Example 1 was repeated, except that poly(butylene phthalate) (60 parts), ε-caprolactone (40 parts), and trimethylolpropane (50 mol %, based on 100 parts by weight of a poly(butylene phthalate) as the crystalline aromatic polyester (A) and calculated under postulation that the molecular weight of the poly(butylene phthalate) be 39,000) were employed, to thereby yield a polyester block copolymer (acid value: 2.9 mgKOH/g, melting point: 200° C.). The copolymer was dried at 120° C. for five hours, to thereby yield a copolymer (water content: 160 ppm) (polyester block copolymer [C]).

Production Example 4

Poly(butylene phthalate) (acid value: 3.5 mgKOH/g, water content: 160 ppm) and ε-caprolactone (acid value: 0.1 mgKOH/g, water content: 70 ppm) employed in Production Example 2 were employed as the crystalline aromatic polyester (A) and the lactone (B), respectively.

The procedure of Production Example 1 was repeated, except that poly(butylene phthalate) (60 parts), ε-caprolactone (40 parts), and 2,4-dihydroxybenzoic acid (150 mol % based on 100 parts by weight of a poly(butylene phthalate) and calculated under postulation that the molecular weight of the poly(butylene phthalate) be 39,000) were employed, to thereby yield a polyester block copolymer (acid value: 3.8 mgKOH/g, melting point: 200° C.). The copolymer was dried at 120° C. for five hours, to thereby yield a copolymer (water content: 170 ppm) (polyester block copolymer [D]).

Production Example 5

Poly(butylene phthalate) employed in Production Example 1 was dried at 150° C. at 1 torr for 1 hour, and the dried product (acid value: 3.5 mgKOH/g, water content: 160 ppm) was employed as the crystalline aromatic polyester (A). Commercially available ε-caprolactone was distilled under reduced pressure, and the distilled product (acid value: 0.1 mgKOH/g, water content: 70 ppm) was employed as the lactone (B).

The procedure of Production Example 1 was repeated, except that the above starting materials were employed, to thereby yield a polyester block copolymer (acid value: 3.3 mgKOH/g, water content: 1,050 ppm, melting point: 203° C.) (polyester block copolymer [E]).

Examples 1 to 12

According to the compositional properties shown in Table 1, each polyester block copolymer composition was prepared by compounding, by means of a twin screw extruder, a polyester block copolymer (100 parts by weight) prepared in Production Examples 2 to 4; epoxy compound 1, epoxy compound 2, and/or epoxy compound 3 as the epoxy compound (C) having two or more functionalities; triphenylphosphine (0.1 part); Irganox 1010 (0.5 part); and an optional mono-alcohol or diol. The physical properties of the resultant composition are shown in Table 1.

The polyester block copolymer composition of the present invention exhibits excellent stability in melt viscosity, resistance to hydrolysis, and resistance to thermal decomposition. In addition, the polyester block copolymer composition of the present invention to which an epoxy compound having a halogen is added exhibits excellent flame retardancy. Therefore, even when the polyester block copolymer composition of the present invention is used under high temperature conditions for a long period of time, the copolymer composition does not undergo heat decomposition.

In Examples 1 to 7, each polyester block copolymer composition was prepared through addition of neither D1 nor D2, and the strain hardenability thereof was found to be 0. Therefore, the copolymer composition is effectively molded through processes other than blow molding.

Comparative Example 1

By means of a twin-screw extruder, the polyester block copolymer (100 parts by weight) prepared in Production Example 1 was compounded with Celloxide 2021P (30 parts by weight, product of Daicel Chem. Ind., Ltd.) and 2-phenylimidazole (1 part by weight) as an imidazole compound. Although the resultant composition was heated for about 10 minutes for determining stability in melt viscosity, the composition gelled. In addition, strain hardening was not observed.

Comparative Example 2

By means of a twin-screw extruder, the polyester block copolymer (100 parts by weight) prepared in Production Example 2 was compounded with Celloxide 2021P (30 parts by weight, product of Daicel Chem. Ind., Ltd.) and the imidazole compound (1 part by weight) employed in Comparative Example 1. The stability in melt viscosity of the resultant composition was found to be 1.2; i.e., a relatively small increase in viscosity. In addition, strain hardening was not observed.

Comparative Examples 3 to 7

According to the compositional properties shown in Table 1, each polyester block copolymer composition was prepared by compounding, by means of a twin-screw extruder, the polyester block copolymer (100 parts by weight) prepared in Production Examples 1 to 3, or 5; the epoxy compound (C) having two or more functionalities; triphenylphosphine (0.1 part); Irganox 1010 (0.5 part); an optional mono-alcohol or diol; and an optional catalyst or stabilizer. The physical properties of the resultant composition are shown in Table 1.

TABLE 1

| | Polyester block copolymers | | | Epoxy compounds | | | Diethylene |
| --- | --- | --- | --- | --- | --- | --- | --- |
| | Type | Acid value[1] mgKOH/g | Water content ppm | 1[2] parts by weight | 2[3] parts by weight | 3[4] parts by weight | glycol parts by weight |
| Comp. Ex. 3 | [A] | 8.6 | 200 | 0.7 | 1.8 | 0 | 0 |
| Comp. Ex. 4 | [B] | 3.5 | 200 | 0 | 0.3 | 0 | 0 |
| Comp. Ex. 5 | [C] | 2.9 | 160 | 0.3 | 0 | 0 | 0 |
| Comp. Ex. 6 | [C] | 2.9 | 160 | 0 | 0.3 | 0 | 0 |
| Comp. Ex. 7 | [E] | 3.3 | 1,050 | 0.7 | 1.8 | 0 | 0 |
| Ex. 1 | [B] | 3.5 | 200 | 0.7 | 1.8 | 0 | 0 |
| Ex. 2 | [B] | 3.5 | 200 | 0.7 | 1.8 | 0 | 0.5 |
| Ex. 3 | [B] | 3.5 | 200 | 0.7 | 1.8 | 20 | 15 |
| Ex. 4 | [B] | 3.5 | 200 | 0 | 0 | 20 | 15 |
| Ex. 5 | [B] | 3.5 | 200 | 0 | 2.5 | 0 | 0 |
| Ex. 6 | [B] | 3.5 | 200 | 2.5 | 0 | 0 | 0 |
| Ex. 7 | [B] | 3.5 | 200 | 0 | 3.5 | 0 | 0.5 |
| Ex. 8 | [C] | 2.9 | 160 | 0.7 | 1.8 | 0 | 0 |
| Ex. 9 | [C] | 2.9 | 160 | 0 | 3.5 | 0 | 0.5 |
| Ex. 10 | [D] | 3.8 | 170 | 0.7 | 1.8 | 0 | 0 |
| Ex. 11 | [D] | 3.8 | 170 | 0 | 3.5 | 0 | 0.5 |
| Ex. 12 | [D] | 3.8 | 170 | 2.5 | 0 | 0 | 0 |

TABLE 1-continued

|  | Acid value of composition[5] mgKOH/g | Color hue (YI) | MI value g/10 min | Melting point °C. | Tensile strength at break kgf/cm² | Tensile elongation at break % | Resistance to hydrolysis % | Resistance to thermal decomposition % | Stability in melt viscosity | Strain hardenability | Drawdown property |
|---|---|---|---|---|---|---|---|---|---|---|---|
| Comp. Ex. 3 | 0.1 | 40 | 6 | 202 | 350 | 700 | 100 | 100 | gelled | 0 | 1.5 |
| Comp. Ex. 4 | 3.6 | 33 | 8 | 200 | 330 | 710 | 23 | 85 | 0.6 | 0 | 1.2 |
| Comp. Ex. 5 | 3.3 | 35 | 6 | 198 | 300 | 650 | 20 | 81 | 0.6 | 0 | 2.0 |
| Comp. Ex. 6 | 2.9 | 33 | 5 | 199 | 300 | 680 | 18 | 93 | 0.7 | 0.2 | 2.2 |
| Comp. Ex. 7 | 2.9 | 42 | 4 | 202 | 340 | 690 | 0 | 100 | gelled | 0 | 2.4 |
| Ex. 1 | 0.1 | 34 | 8 | 201 | 340 | 650 | 100 | 100 | 1.2 | 0 | 1.3 |
| Ex. 2 | 0.1 | 32 | 8 | 200 | 350 | 700 | 100 | 100 | 1.0 | 0 | 1.3 |
| Ex. 3 | 0.1 | 42 | 10 | 198 | 280 | 630 | 100 | 100 | 1.2 | 0 | 1.1 |
| Ex. 4 | 0.1 | 43 | 16 | 196 | 280 | 600 | 100 | 100 | 1.1 | 0 | 0.6 |
| Ex. 5 | 0.1 | 33 | 4 | 201 | 320 | 690 | 100 | 100 | 1.1 | 0 | 2.4 |
| Ex. 6 | 0.1 | 37 | 4 | 202 | 330 | 710 | 100 | 100 | 1.1 | 0 | 2.0 |
| Ex. 7 | 0.1 | 34 | 4 | 198 | 330 | 710 | 100 | 100 | 1.0 | 0 | 2.2 |
| Ex. 8 | 0.1 | 36 | 2 | 198 | 320 | 650 | 100 | 100 | 1.1 | 1.0 | 3.5 |
| Ex. 9 | 0.1 | 34 | 1 | 195 | 320 | 690 | 100 | 100 | 1.0 | 0.8 | 3.9 |
| Ex. 10 | 0.1 | 35 | 1 | 198 | 320 | 700 | 100 | 100 | 1.1 | 1.2 | 4.0 |
| Ex. 11 | 0.1 | 34 | 1 | 193 | 340 | 670 | 100 | 100 | 1.0 | 0.9 | 4.4 |
| Ex. 12 | 0.1 | 38 | 2 | 194 | 330 | 720 | 100 | 100 | 0.9 | 0.7 | 3.6 |

Remarks in Table 1 are as follows.
[1]Acid value of a polyester block copolymer;
[2]Alicyclic epoxide (Celloxide 2021P (Trade name of Daicel Chem. Ind., Ltd.));
[3]Diglycidyl ester (Epomik R540 (Trade name of Mitsui Chemicals, Inc.));
[4]Self-extinguishing epoxy compound (Epomik R230 (Trade name of Mitsui Chemicals, Inc.)); and
[5]Acid value of a polyester block copolymer composition.

INDUSTRIAL APPLICABILITY

The polyester block copolymer composition of the present invention exhibits stability in viscosity during molding; generates remarkably few flashes during molding; exhibits great dependency of melt viscosity on rate of elongation strain; and provides molded products having uniform thickness through blow molding. In addition, the molded products have remarkably excellent resistance to hydrolysis and heat resistance as well as characteristics which the polyester block copolymer per se possesses.

What is claimed is:

1. A polyester block copolymer composition obtained by reacting 0.5 to 5.0 parts by weight of an epoxy compound (C) having two or more functionalities with 100 parts by weight of a polyester block copolymer (P) having an acid value of 0 to 5 mg KOH/g obtained by reacting a crystalline aromatic polyester (A) having a hydroxyl group at a molecular terminal with a lactone (B) and a polyfunctional compound (D) having three or more groups, wherein said groups are carboxyl, hydroxyl, or ester.

2. A polyester block copolymer composition as claimed in claim 1, wherein the polyfunctional compound (D) is a polyfunctional compound (D1) in which at least one of the three or more groups is carboxyl or ester, and the polyester block copolymer composition is formed by reacting 0.1 to 200 mol % of the polyfunctional compound (D1) with 100 mol % of the crystalline aromatic polyester (A).

3. A polyester block copolymer composition as claimed in claim 1, wherein the polyfunctional compound (D) is a polyfunctional compound (D2) which has neither carboxyl group nor an ester group thereof, and the polyester block copolymer composition is formed by reacting 0.1 to 150 mol % of the polyfunctional compound (D2) with 100 mol % of the crystalline aromatic polyester (A).

4. A polyester block copolymer composition as claimed in claim 1, which further contains a mono-alcohol (d) and/or a polyol (d') in a total amount of 0.1 to 3.0 parts by weight based on 100 parts by weight of the polyester block copolymer (P).

5. A polyester block copolymer composition as claimed in claim 1, which contains the epoxy compound (C) having two or more functionalities and/or an epoxy compound (C') having a halogen in a total amount of 2.0 to 30.0 parts by weight based on 100 parts by weight of the polyester block copolymer (P).

6. A polyester block copolymer composition as claimed in claim 5, which further contains a mono-alcohol (d) and/or a polyol (d') in a total amount of 0.5 to 28.0 parts by weight based on 100 parts by weight of the polyester block copolymer (P).

7. A polyester block copolymer composition as claimed in claim 1, which further contains a trivalent phosphorus compound (F) in an amount of 0.1 to 10 parts by weight based on 100 parts by weight of the polyester block copolymer (P).

8. A polyester block copolymer composition as claimed in claim 1, wherein the epoxy compound (C) having two or more functionalities is an alicyclic epoxide, a glycidyl ester, or a mixture thereof.

9. A polyester block copolymer composition as claimed in claim 5, wherein the epoxy compound (C') having a halogen is an epoxy compound having a bromine atom.

10. A polyester block copolymer composition as claimed in claim 1, wherein the polyester block copolymer (P) has a water content of 300 ppm or less.

11. A polyester block copolymer composition as claimed in claim 1, which has an acid value of 1.0 mg KOH/g or less.

* * * * *